Oct. 23, 1928.  1,688,368
C. W. WALKER
BOTTLE CRATE FEED MECHANISM
Filed April 15, 1926
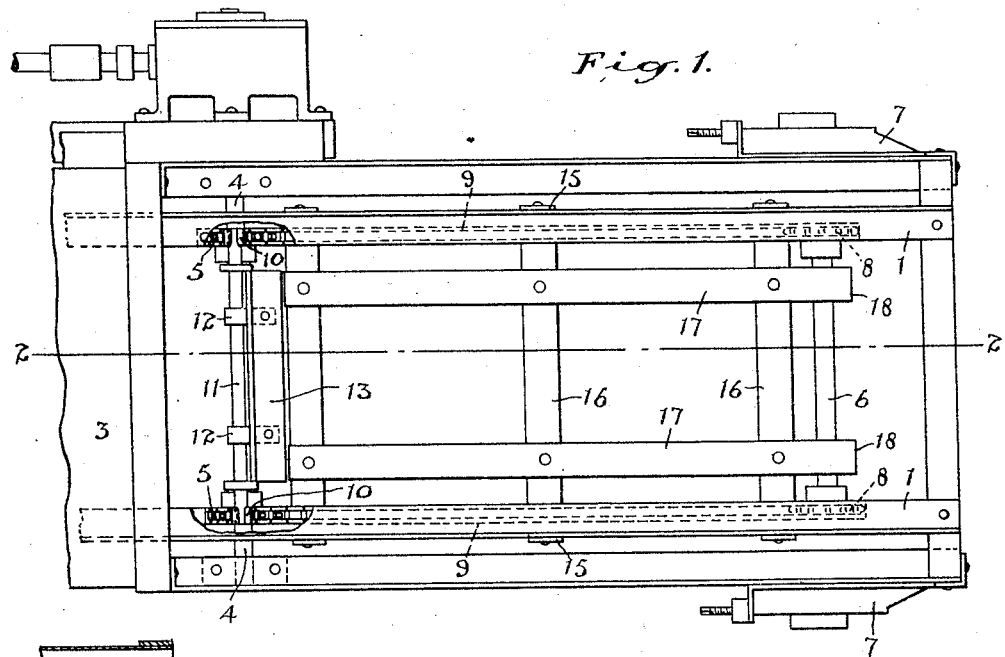
Fig. 1.
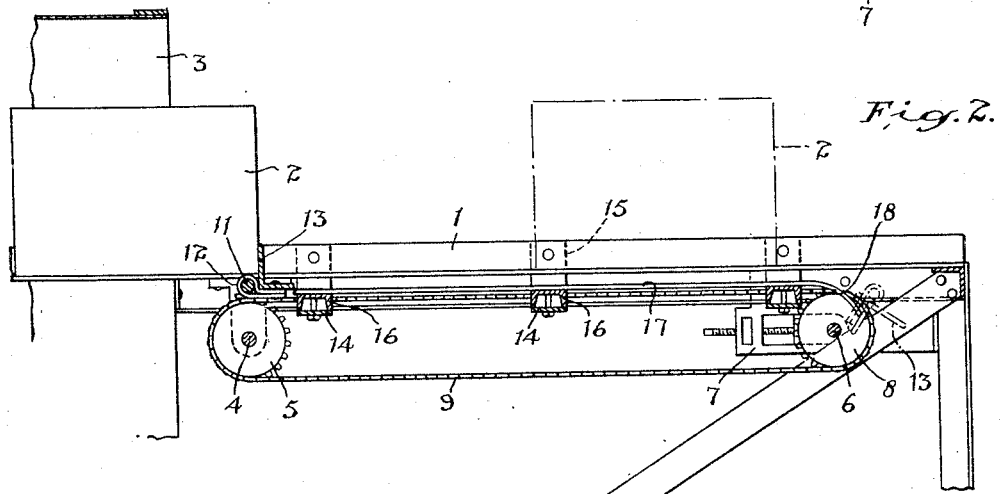
Fig. 2.
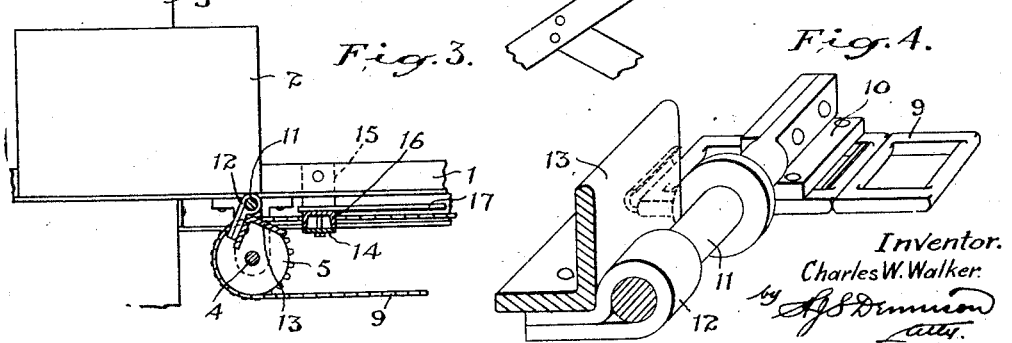
Fig. 3.
Fig. 4.
Inventor.
Charles W. Walker.

Patented Oct. 23, 1928.

1,688,368

UNITED STATES PATENT OFFICE.

CHARLES W. WALKER, OF TORONTO, ONTARIO, CANADA, ASSIGNOR TO WALKER-WALLACE LIMITED, OF TORONTO, CANADA.

BOTTLE-CRATE FEED MECHANISM.

Application filed April 15, 1926. Serial No. 102,326.

The principal objects of the invention are, to provide a mechanism for feeding bottle crates to a sterilizer or filling machine which will positively engage and force the crates along the supporting guides without injury.

The principal feature of the invention consists in the novel construction and arrangement of hinged members carried by an endless belt and cooperating with a fixed trackway, whereby the crates placed upon guides are moved therealong and engaging members are adapted to swing backwardly to clear the crates.

In the drawings, Figure 1 is a plan view of my feed mechanism.

Figure 2 is a sectional elevational view through the line 2—2 of Figure 1.

Figure 3 is a sectional elevational view showing the engaging member swung clear of the crate.

Figure 4 is a perspective view showing the method of connecting the pusher support to the endless belt.

The present apparatus is used particularly in conjunction with sterilizing chambers for sterilizing milk bottles, though it may be used in connection with other forms of sterilizers or as a feed mechanism for carrying crates or parcels along a guideway.

The trackways or guides 1 on which the crates 2 are to be moved are here shown in the form of angle irons which are rigidly supported on suitable frame-work and extend into the sterilizer.

Adjacent to the sterilizer casing 3 a cross shaft 4 is supported and on this shaft are secured a pair of sprocket wheels 5 preferably beneath the guides 1.

A shaft 6 is supported transversely of the frame at the outer end in the longitudinally adjustable bearing blocks 7 and sprocket wheels 8 are mounted on said shaft in alignment with the wheels 5.

Endless chain belts 9 extend around the pairs of sprockets 5 and 8 and secured to these chain belts are a pair of brackets 10 which carry a rod 11 extending transversely thereof.

A pair of brackets 12 are rotatably mounted on the rod 11 and carry an angle iron cross bar 13, the upright flange of which is adapted to extend above the bottom flange of the guides 1 and engage the ends of the bottle crates 2 placed upon said guides.

A plurality of bars 14 having upturned ends 15 are suspended from the sides of the guides 1 and extend across beneath the upper portion of the endless belts 9 and between the chain belts are arranged short length channel bars 16 rigidly secured to the bars 14.

A pair of guides in the form of flat metal bars 17 are rigidly mounted on the tops of the short length channels 16 and these are formed with downwardly curved ends 18 which extend below the upper length of the endless belts, being preferably arranged just back of the outward perimeter of the sprockets 8.

The curved ends of these guides extend into the pathway of the pivot angle bars 13 and engage the under flange thereof so that said flange will ride up on the bars and travel horizontally on the horizontal portions extending parallel with the guides 1 holding the upright flange in position to engage and push the bottle crates longitudinally on the guides.

When the bars 13 reach the end of their path of travel instead of being carried around the inner sprocket wheels 5 with the outwardly extending flange engaging the crates maintaining a radial relation to the sprocket, the guides 17 stop and the angle bar running off the ends of the guides simply swings on its pivotal supports on the rod 11 and drops away from the crate, thus swinging free of the crate as illustrated in Figure 3 and eliminating the chewing of the box by the carriers or propelling members.

The device herein described is extremely simple but it is very effective in the feeding of the crates to the sterilizer and continues to pick up, feed and release the crates placed upon the guides without damage thereto.

What I claim as my invention is:—

1. In a bottle crate feed mechanism, the combination with flanged crate guides adapted to receive and slidably support the crates, of a pair of endless belts arranged adjacent to said guides, an angle bar hingedly supported between said belts, and a fixed guide arranged parallel with said crate supporting guides adapted to engage the lower flange of the angle bar to hold the other flange in a vertical crate engaging position throughout the longitudinal travel of the endless belts, said fixed guide being adapted to release the angle bar allowing it to swing backward free of engagement with the crate at the end of the longitudinal movement.

2. In a bottle crate feed mechanism, the combination with crate guides, of a pair of endless belts arranged adjacent to said guides and extending parallel therewith, a rod secured to said belts and extending therebetween, bracket members hinged on said rod, an angle member secured to said hinged brackets, and a fixed guide bar having a downturned end adapted to project beneath the swinging angle member and to support the angle member with its upright portion in a vertical position, said guide ending to allow the angle member to swing backwardly and clear the crate before it is caused to tip forwardly by the travel of the endless carrier around the supporting sprockets.

3. In a bottle crate feed mechanism, the combination with a pair of flanged crate guides spaced parallelly apart and adapted to receive and support the crates, of a pair of endless belts spaced apart and arranged below said flanged crate guides, hinged means connected with and extending between said spaced belts and adapted to engage the crates to slide same along the flanged guides, and guide bars arranged between said flanged crate guides and of shorter length than said bars and being spaced below the level thereof and engaging said hinged crate engaging means in sliding contact to support the same in a forward position in engagement with the crates, said crate engaging means being adapted to swing backwardly when passing beyond the end of the lower engaging guide bars to release its engagement with the crate.

CHARLES W. WALKER.